United States Patent [19]

Kan et al.

[11] Patent Number: 4,559,633
[45] Date of Patent: Dec. 17, 1985

[54] SPREAD SPECTRUM SYSTEM

[75] Inventors: Kazutoshi Kan; Junichi Oizumi, both of Ibaraki, Japan

[73] Assignee: Hitachi, Ltd., Tokyo, Japan

[21] Appl. No.: 542,023

[22] Filed: Oct. 14, 1983

[30] Foreign Application Priority Data

Oct. 22, 1982 [JP] Japan ................................. 57-184541
Feb. 7, 1983 [JP] Japan ................................. 58-17325

[51] Int. Cl.⁴ ............................................. H04L 1/00
[52] U.S. Cl. .......................................... 375/1; 370/18
[58] Field of Search ............................. 375/1, 2.1, 2.2; 370/18, 19; 455/26, 30; 179/1.5 M

[56] References Cited

U.S. PATENT DOCUMENTS

| | | | |
|---|---|---|---|
| 4,112,372 | 9/1978 | Holmes et al. | 375/1 |
| 4,122,393 | 10/1978 | Gordy et al. | 375/1 |
| 4,149,121 | 4/1979 | Gordy et al. | 375/1 |
| 4,279,018 | 7/1981 | Carson | 375/1 |
| 4,475,208 | 10/1984 | Ricketts | 370/18 |

*Primary Examiner*—Douglas W. Olms
*Attorney, Agent, or Firm*—Antonelli, Terry & Wands

[57] ABSTRACT

A spread-spectrum communication system includes a transmitter for transmitting a spectrum-spread signal and a receiver for receiving the data signal. To establish synchronism between the signals transmitted and received, the receiver includes a first loop circuit for establishing synchronism in frequency and phase of a carrier for the spectrum-spread data signal, and a second loop circuit for detecting the synchronism of spectrum spreading code signal of a spectrum spread data signal after the carrier has been removed by said first loop circuit.

12 Claims, 9 Drawing Figures

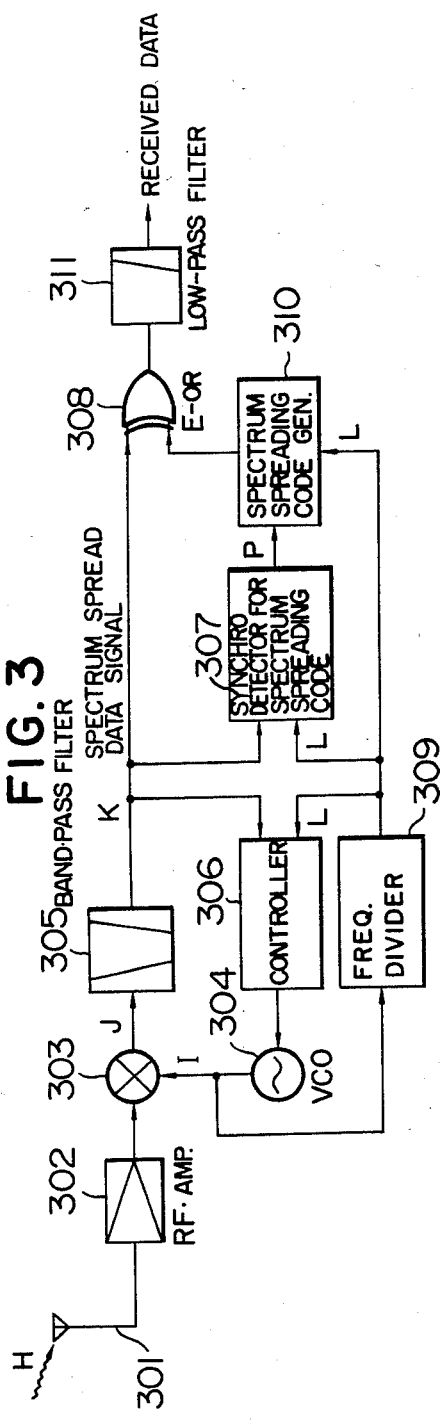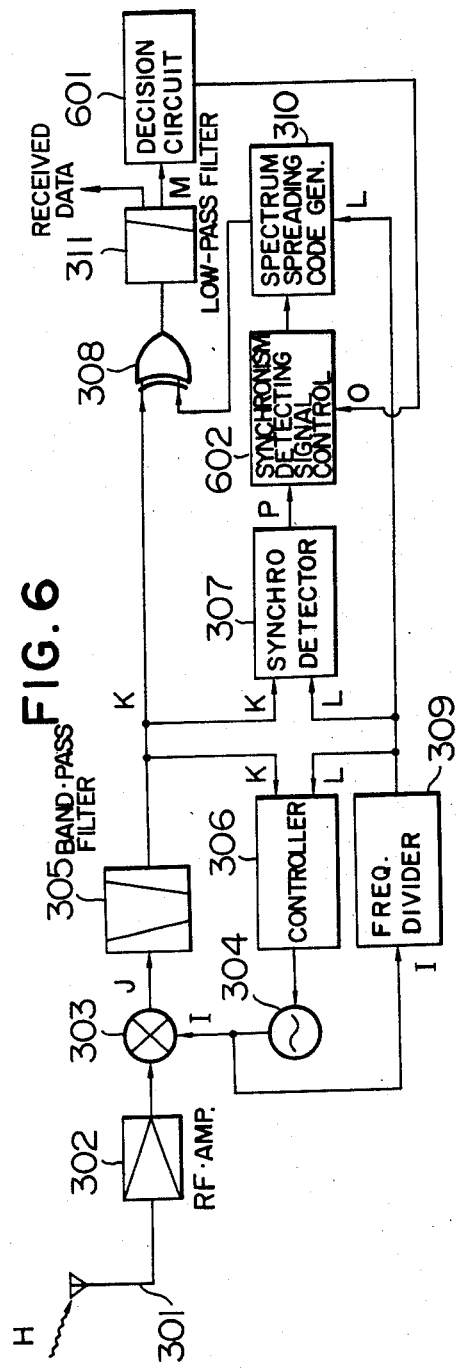

SPREAD SPECTRUM SYSTEM

BACKGROUND OF THE INVENTION

The present invention generally relates to a spread-spectrum (communication) system of a direct sequencing spread spectrum modulation type and more particularly to a spread-spectrum communication system in which synchronism between a transmitter and a receiver is held in a satisfactory manner.

In the field of modern industrial machines, progress is made in systematization. There prevails a tendency that controls are allocated in a dispersed manner and/or supervised centrally. Under the circumstance, importance is put on the information or data transmitting path more and more. As an example of such system, there may be mentioned a communication system destined for controlling movable machines which can move freely.

In the communication system of the type mentioned above, adoption of wire communication is not preferred in applications where the movable machines are allowed to move around over a wide area. On the other hand, in case the movable machines are moved in a region where plants are operated, the use of electromagnetic wave of high energy level for the data transmission is undesirable because disturbance may then be given to electronic instruments and equipments of the plants.

Such being the circumstances, a spread-spectrum communication system is reconsidered which permits transmission by electromagnetic wave of relatively low energy level and is excellent in the noise insusceptibility.

According to the spread-spectrum communication system, a data signal to be transmitted is converted into a signal having a broader bandwidth than the bandwidth that the data signal has inherently before being transmitted, whereby communication of high quality can be realized. More particularly, in the transmitter, a carrier modulated with a specific code which is called a pseudo noise code and has a sufficiently broader bandwidth than the information or data signal is modulated with the data signal again and transmitted. On the other hand, in the receiver, the received signal is demodulated with a spectrum spreading code which is same as the pseudo noise code used in the transmitter, to thereby receive selectively the transmitted data signal.

The spread-spectrum communication is valid on the condition that the spreading code used in the receiver perfectly coincides in phase with the spreading code contained in the received signal.

According to the literature (R. C. Dixon, Tateno, Latest Spectrum Spread Communication) published Oct. 25, 1981 this synchronization for synchronizing phase and frequency needs much time. An example of a synchronizing circuit for the phase matching or coincidence is disclosed in Japanese Laid-Open Patent Application No. 31,246/1981.

However, the prior art spread-spectrum communication system requires two carriers in one way communication.

SUMMARY OF THE INVENTION

An object of the present invention is to provide a spread-spectrum communication system which can establish synchronism at a high speed by reducing the synchronism establishing time in only one carrier.

It is another object of the invention to provide a spread-spectrum communication system which is capable of establishing synchronism between the signals with an improved accuracy.

It is still another object of the present invention to provide a spread-spectrum communication system which allows communications to be performed at random among a plurality of transmitter/receiver with an improved efficiency.

In view of the above objects, there is provided according to an aspect of the present invention a spread-spectrum communication system in which a receiver for receiving a spectrum-spread signal includes a first loop circuit for establishing synchronism in frequency and phase of a carrier of the spectrum-spread signal and a second loop circuit for detecting synchronism of a spectrum spread data signal obtained by removal of the carrier by the first loop circuit.

Other objects, features and advantages of the invention will be more apparent from the following description of the preferred embodiments of the invention.

BRIEF DESCRIPTION OF THE DRAWINGS

For better understanding of the invention as well as other objects and further features thereof, reference is made to the following detailed description of the invention to be read in connection with the accompanying drawings wherein:

FIG. 3 is a circuit diagram showing an exemplary circuit arrangement of a receiver which constitutes another part of the communication system according to the invention;

FIG. 6 is a circuit diagram showing another exemplary embodiment of the receiver constituting a part of the communication system according to the invention.

DESCRIPTION OF THE PREFERRED EMBODIMENTS

Figure 1:
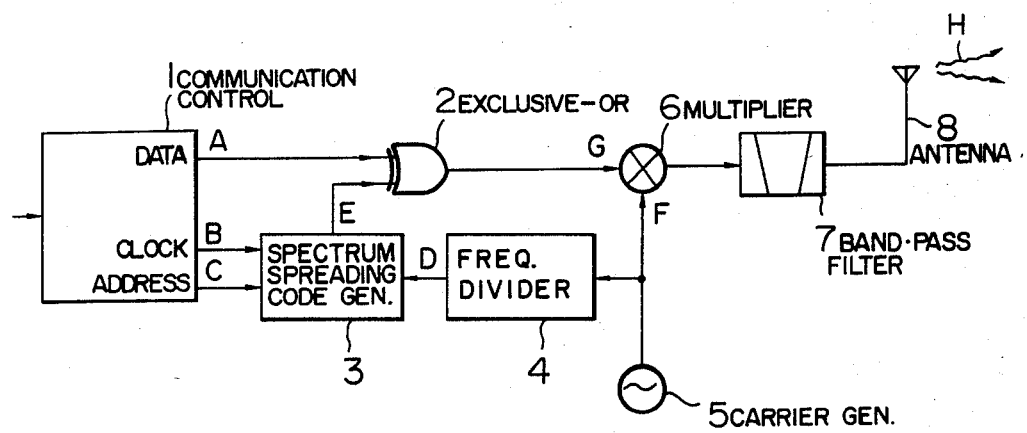
FIG. 1 is a circuit diagram showing an exemplary circuit arrangement of a transmitter constituting a part of the communication system according to the invention.

An arrangement of a communication system according to the present invention will now be described by referring to the drawings.

The communication system according to the invention is composed of a transmitter shown in FIG. 1 and a receiver shown in FIG. 3. Circuit arrangements of the transmitter and the receiver will be described below in this order.

Figure 2:
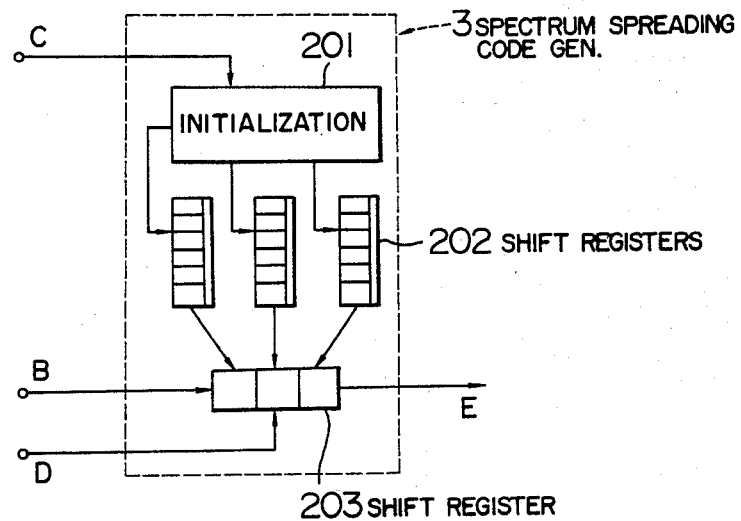
FIG. 2 is a schematic circuit diagram showing an arrangement of a spectrum spreading code generator constituting a part of the transmitter shown in FIG. 1.

The transmitter shown in FIG. 1 is connected to a control system (not shown) by way of a communication control unit 1 which serves as an interface. The communication control unit 1 produces as an output signal a data signal A to be transmitted which is supplied to an Exclusive-OR circuit (EOR) 2 and additionally produces a transmission start signal B and a destination address signal C both of which signals are supplied to a spectrum spreading code generator 3, which is realized in such a circuit configuration as shown in FIG. 2 and prepares a spectrum spreading code signal E on the basis of the aforementioned transmission start signal B, the destination address signal C and a basic clock pulse signal D supplied from a frequency divider 4, the spectrum spreading code E thus prepared being supplied to the Exclusive-OR circuit 2. More particularly, the spectrum spreading code generator 3 is so arranged as to be capable of selecting a spectrum spreading code in dependence on the destination address signal C and starting the generation of the code E in response to the transmission start signal B. The frequency divider 4 functions to divide a carrier signal F outputted by a carrier frequency generating oscillator 5 to thereby produce the basic clock pulse signal D mentioned above. The Exclusive-OR circuit 2 spreads the spectrum of the data signal A for transmission in accordance with the spectrum spreading code E. The spectrum-spread data signal for transmission, labelled G, is multiplied by the carrier F supplied from the oscillator 5 through a multiplier 6 to thereby undergo biphase modulation and sent out as a transmitted signal H from an antenna 8 after having passed through a band pass filter 7.

FIG. 2 shows in detail a circuit configuration of the spectrum spreading code generator 3. This code generator 3 is composed of an initial value setting or initialization device 201, feed-back type shift registers 202 and another shift register 203. The outputs of the feed-back type shift registers 202 are supplied to the inputs of the shift register 203 for producing a spectrum spreading code E.

Figure 4:
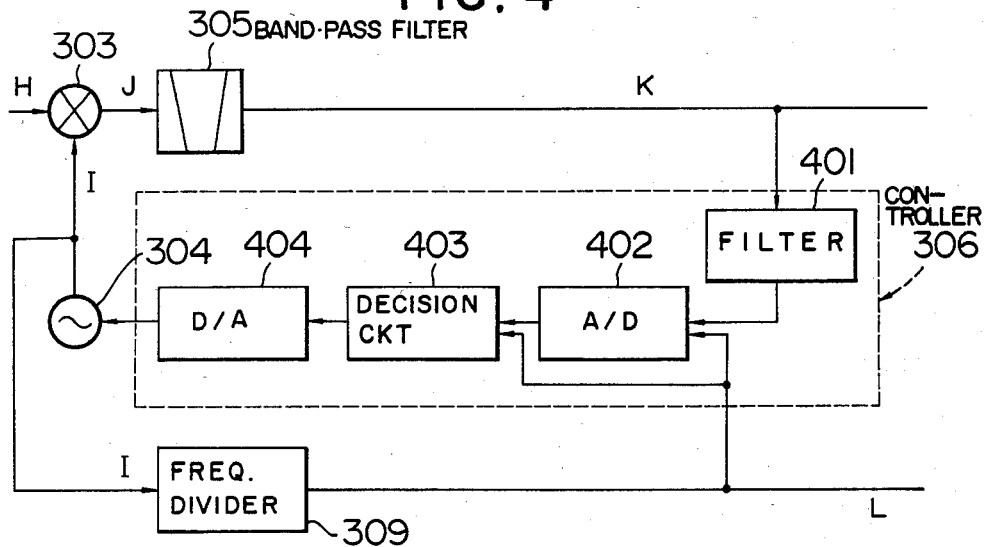
FIG. 4 is a circuit diagram showing an arrangement of a controller for a voltage-controlled oscillator which constitutes a part of the receiver shown in FIG. 3.

Next, referring to FIG. 3, description will be made on an exemplary circuit arrangement of the receiver employed in the communication according to the invention. Referring to the figure, the transmitted signal H sent from the transmitter is received by an antenna 301 and supplied to a multiplier 303 after having been amplified by a radio-frequency amplifier 302 and passed through a band pass filter 305, whereby the transmitted signal H is multiplied by a local oscillation carrier I generated by a voltage-controlled oscillator (VCO) 304 which constitutes a local oscillator. The output signal J from the multiplier 303 is caused to pass through the band pass filter 305 which removes the carrier component to thereby produce the spectrum spread data signal K. This signal K is supplied to a controller 306 for the voltage-controlled oscillator 304, a synchronous detector 307 for the spectrum spreading code and an Exclusive-OR circuit 308. The local oscillation carrier I generated by the voltage-controlled oscillator 304 is also supplied to a frequency divider 309 to be outputted therefrom as a basic clock pulse signal L which is then coupled to the controller 306 for the voltage-controlled oscillator 304, the synchronous detector 307 for the spectrum spreading code and a spectrum spreading code generator 310, respectively. The controller 306 serves to supply a control signal for phase stabilization of the voltage-controlled oscillator 304 by regulating the voltage supplied to the latter. The controller 306 for the voltage-controlled oscillator 304 comprises a filter 401, an A/D (analog-to-digital) converter 402, a decision or discrimination circuit 403 and a D/A converter 404, as is shown in FIG. 4, wherein the signal K representing the product of the received signal H and the output of the local oscillator I is caused to pass through the filter 401 to be converted into a signal of DC component which is subsequently digitized through the sampling effected by the A/D converter 402 at a high speed. The digital output of the A/D converter 402 is supplied to an input of the decision or discrimination circuit 403 which controls the voltage supplied to the voltage-controlled oscillator 304 so that the currently sampled value is always maximum when compared with the value sampled at the immediately preceding time point, to thereby maintain the phase of the output signal from the voltage-controlled oscillator 304 in a stabilized state. By virtue of the loop circuit including the controller 306 for the voltage-controlled oscillator 304, the carrier I generated through local oscillation and the received carrier are synchronized with each other with respect to the frequency as well as phase.

Figure 5:
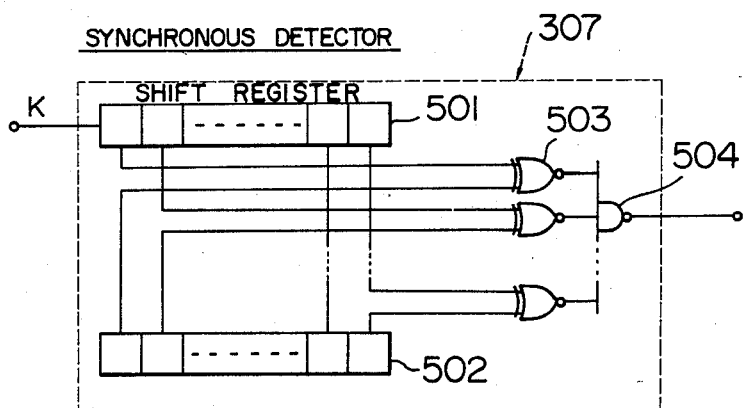
FIG. 5 is a circuit diagram showing a circuit configuration of a synchronous detector for a spectrum spreading code which constitutes another part of the receiver shown in FIG. 3.

FIG. 5 shows a circuit arrangement of the synchronous detector 307 for the spectrum spreading code. As can be seen in the figure, the synchronous detector 307 comprises a shift register 501, a bit string or train setting unit 502 for setting synchronism for the spectrum spreading code, an inverted Exclusive-OR circuit (EOR) and a NAND circuit 504. A train of received codes are supplied sequentially to the input K to be stored in the shift register 501. Coincidence between the code string placed in the shift register 501 and a particular bit string for a predetermined spectrum spreading code string in the synchronism bit train setting unit 502 is detected by the inverted Exclusive-OR circuit 503, while coincidence is detected for all the bits by the NAND circuit 504.

The synchronism detecting signal produced by the synchronous detector 307 for the spectrum spreading code signal is supplied to the spectrum spreading code generator 310 shown in FIG. 3 which will then produce the spectrum spreading code in response to the basic clock pulse signal L, the spectrum spreading code signal thus produced being supplied to the Exclusive-OR circuit 308. On the basis of the spectrum spreading code input, the Exclusive-OR circuit 308 despreads spectrum of the received signal. The output signal from the Exclusive-OR circuit 308 is reproduced as the received data signal after having passed through a low-pass filter 311. The received data signal is utilized as a control signal for a control system connected to the receiver.

With the arrangement of the embodiment of the invention described above, synchronization in the carrier frequency and phase can be accomplished independent of the correlation for the spectrum spreading code with the aid of the loop circuit inclusive of the controller 306 for the voltage-controlled oscillator 304, whereby the time required for establishing the synchronism can be significantly reduced. Moreover, since the starting point of the spectrum spreading code can be detected by the synchronous detector for the spectrum spreading code signal in succession to the establishment of synchronism for the carrier, the received signal can have the spectrum thereof despread with an enhanced accuracy.

FIG. 6 shows a receiver unit of a spread-spectrum communication system according to another embodiment of the invention. In this figure, similar or same components as those shown in FIG. 3 are designated by like reference symbols and repeated description thereof is omitted. The receiver shown in FIG. 6 is so arranged that operation of the synchronous detector 307 for the spectrum spreading code can be assured with a high reliability without failure. More particularly, an erroneous synchronism detecting signal possibly produced by the synchronous detector 307 due to noise in transmission upon establishment of synchronism is rejected to establish correct synchronism, while erroneous generation of the synchronism detecting signal due to transmission noise is suppressed in the correctly synchronized state. To realize the function mentioned above, a decision circuit 601 for discriminatively identifying the despread signal M is provided on the output side of the low-pass filter 311, wherein a synchronism detecting signal control circuit 602 interposed between the synchronous detector 307 and the spectrum spreading code generator 301 is controlled by the signal produced by the decision circuit 601. To this end, the decision circuit 601 fetches the despread signal M to compare the latter with a present decision level N. In dependence on the result of the comparison or decision, the circuit 601 adjusts the control signal O supplied to the synchronism detecting signal control circuit 602. In response to the control signal O, the synchronism detecting signal control circuit 602 controls correspondingly the detection signal produced by the synchronous detector 307 to thereby produce a signal for triggering the spectrum spreading code generator 310.

Figure 7:
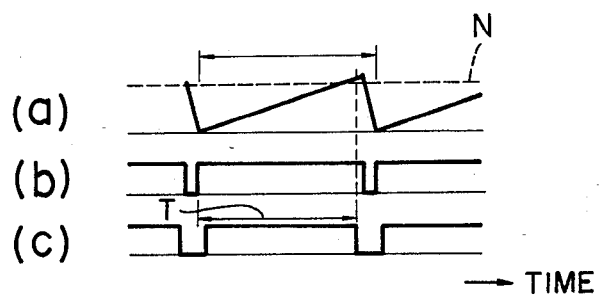
FIGS. 7 to 9 are views showing signal waveforms for illustrating operations of a decision circuit and a synchronism detecting signal control circuit used in the receiver shown in FIG. 6.
Figure 8:
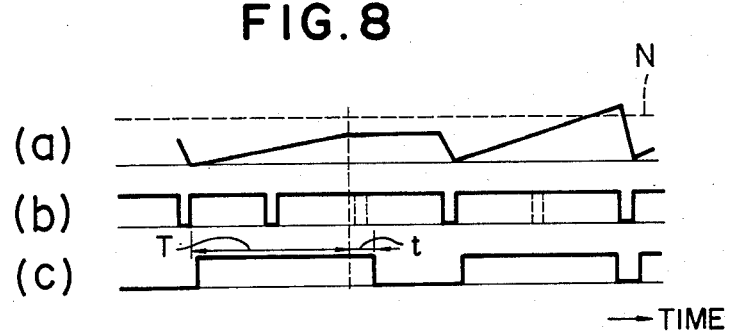
Figure 9:
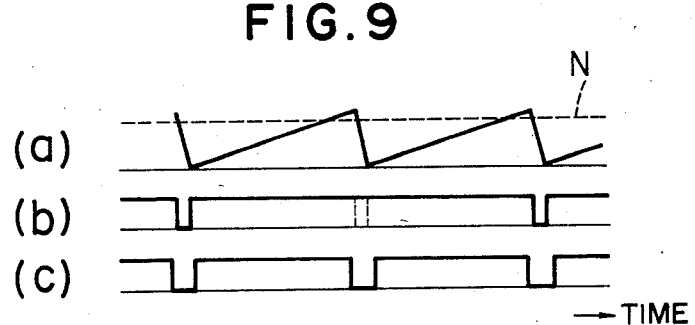

Operation of the decision circuit 601 shown in FIG. 6 will be elucidated in detail by referring to FIGS. 7 to 9, in which the signal M is illustrated at (a), the synchronism detecting signal P is illustrated at (b), and the control signal O is illustrated at (c).

FIG. 7 shows the waveforms of the above signals on the assumption that synchronization is correctly established. At a time point at which a predetermined time T shorter than one period has elapsed from the rise-up of the synchronism detecting signal P, the signal M is comparatively identified with reference to the decision level N. Since the signal M is beyond the decision level N in this case, the control signal O is set to a low level. So long as the control signal O is at low level, the synchronism detecting signal P of low level is accepted, wherein the synchronism detecting signal control circuit 602 triggers or activates the spectrum spreading code generator 310, resulting in the correct synchronization which is also held in the succeeding period.

FIG. 8 illustrates waveforms of the signals in concern on the assumption that an erroneous synchronism detecting signal intervenes in the detection of synchronization. Initially, the control signal O is at low level, while the synchronism detecting signal P is not at low level. When the synchronism detecting signal P becomes low, the signal M is cleared at the rise-up of the signal P, as the result of which the control signal O becomes at high level to accept no more the synchronism detecting signal P. At a time point at which a duration T has elapsed from the time point when the control signal O assumed the high level, the level of the signal M is decided with the reference level N. Since the signal M is below the reference level N in this case, the control signal O continues to assume the high level further for a time t. Accordingly, during the time interval t, the synchronism detecting signal P of low level is not accepted. Subsequently, the control signal O becomes at low level with the low level of the succeeding synchronism detecting signal P being awaited. In this way, the correct synchronization can be established. Thereafter, the synchronization illustrated in FIG. 7 is held.

FIG. 9 shows the corresponding signal waveforms on the assumption that the synchronism detecting signal P is erroneously prevented from becoming low in the synchronized state notwithstanding of the fact that the signal P should go low. In this case, the synchronism detecting signal control circuit 602 produces internally the signal for triggering the spectrum spreading code generator 310 in anticipation of the synchronism detecting signal P, to thereby prevent the occurrence of the out-of-synchronization.

In this way, correct synchronization can be established and held stably, whereby realiability of communication over the transmission system subjected to a great deal of noise can be significantly improved.

We claim:

1. A spread-spectrum communication system comprising transmitting means for transmitting as a spectrum spread data signal a carrier modulated with data to be transmitted and a spreading code, and receiving means for receiving the carrier and said spreading code from said transmitting means to demodulate said carrier and said spreading code in synchronism with a local oscillation carrier signal of said receiving means for despreading thereby to reproduce said data, said transmitting means including transmitting clock pulse means for producing a clock pulse for said data and spreading code by dividing said carrier, said transmitting means transmitting said data, spreading code and carrier in synchronism with each other, said receiving means including a first loop circuit means for establishing synchronism between said local oscillation carrier signal and said received carrier and for effecting a synchronous demodulation, receiving clock pulse means for producing a clock pulse for the received spreading code by dividing said local oscillation carrier signal, and a second loop circuit means for establishing synchronism for said spreading code by said clock pulse from said receiving clock pulse means and for despreading the synchronized and demodulated signal from said first loop circuit means to reproduce the data.

2. A spread-spectrum communication system according to claim 1, wherein said first loop circuit means includes a voltage-controlled oscillator constituting a local oscillator providing the local oscillation carrier signal, a multiplier for multiplying the received data signal by the local oscillation carrier signal produced by said voltage-controlled oscillator to thereby produce as the output a signal for modulating the spectrum spread data signal after the carrier has been removed, and a controller supplied as the input thereto with said spectrum spread data signal to regulate a voltage supplied to said voltage-controlled oscillator so that said modulating signal becomes a maximum, controlling thereby said voltage-controlled oscillator so that a phase is maintained stably.

3. A spread-spectrum communication system according to claim 2, wherein said controller for said voltage-controlled oscillator includes a decision circuit which samples a DC component of said spectrum spread data signal and compares the sampled value with the value sampled at an immediately preceeding time point, to thereby set the currently sampled value constantly at a maximum.

4. A spread-spectrum communication system according to claim 1, wherein said second loop circuit means includes a synchronous detector for said spreading code which serves to detect coincidence between a code train in the data spectrum spreading code modulating signal and a preset spectrum spreading code train, a spectrum spreading code generator for producing a spectrum spreading code in response to the synchronism detecting signal output from said synchronous detector, and an Exclusive-OR circuit for despreading the spectrum of the received signal on the basis of said spectrum spread data signal and said spectrum spreading code produced by said spectrum spreading code generator.

5. A spread-spectrum communication system according to claim 4, wherein said synchronous detector for the spectrum spreading code includes a register for storing a code train of the spectrum spread data signal, a setting bit train for storing a preset spectrum spreading code synchronizing bit train, and an inverted Exclusive-OR circuit for detecting coincidence between the code train placed in said shift register and the code train represented by said setting bit train.

6. A spread-spectrum communication system according to claim 5, further including a control circuit interposed between said synchronous detector for the spectrum spreading code and said spectrum spreading code generator for controlling the synchronism detecting signal output from said synchronous detector, and a decision circuit provided at the output side of said Exclusive-OR circuit for controlling the start of generation of said synchronism detecting signal by deciding whether the despread received signal is correct or erroneous.

7. A spread-spectrum communication system according to claim 2, wherein said second loop circuit means includes a synchronous detector for the spectrum spreading code which serves to detect coincidence between a code train in the data spectrum spreading code modulating signal and a preset spectrum spreading code train, a spectrum spreading code generator for producing a spectrum spreading code in response to the synchronism detecting signal output from said synchronous detector, and an Exclusive-OR circuit for despreading the spectrum of the received signal on the basis of said spectrum spreaded data signal and said spectrum spreading code produced by said spectrum spreading code generator.

8. A spread-spectrum communication system according to claim 7, wherein said synchronous detector for the spectrum spreading code includes a register for storing a code train of the spectrum spread data signal, a setting bit train for storing a preset spectrum spreading code synchronizing bit train, and an inverted Exclusive-OR circuit for detecting coincidence between the code train placed in said shift register and the code train represented by said setting bit train.

9. A spread-spectrum communication system according to claim 8, further including a control circuit interposed between said synchronous detector for the spectrum spreading code and said spectrum spreading code generator for controlling the synchronism detecting signal output from said synchronous detector, and a decision circuit provided at the output side of said Exclusive-OR circuit for controlling the start of generation of said synchronism detecting signal by deciding whether the despread received signal is correct or erroneous.

10. A spread-spectrum communication system according to claim 3, wherein said second loop circuit means includes a synchronous detector for the spectrum spreading code which serves to detect coincidence between a code train in the data spectrum spreading code modulating signal and a preset spectrum spreading code train, a spectrum spreading code generator for producing a spectrum spreading code in response to the synchronism detecting signal output from said synchronous detector, and an Exclusive-OR circuit for despreading the spectrum of the received signal on the basis of said spectrum spread data signal and said spectrum spreading code produced by said spectrum spreading code generator.

11. A spread-spectrum communication system according to claim 10, wherein said synchronous detector for the spectrum spreading code includes a register for storing a code train of the spectrum spread data signal, a setting bit train for storing a preset spectrum spreading code synchronizing bit train, and an inverted Exclusive-OR circuit for detecting coincidence between the code train placed in said shift register and the code train represented by said setting bit train.

12. A spread-spectrum communication system according to claim 11, further including a control circuit interposed between said synchronous detector for the spectrum spreading code and said spectrum spreading code generator for controlling the synchronism detecting signal output from said synchronous detector, and a decision circuit provided at the output side of said Exclusive-OR circuit for controlling the start of generation of said synchronism detecting signal by deciding whether the despread received signal is correct or erroneous.

* * * * *